July 9, 1946.  J. P. SMITH  2,403,562
RECORDER FOR RADAR SYSTEMS
Filed Aug. 30, 1943   3 Sheets-Sheet 2
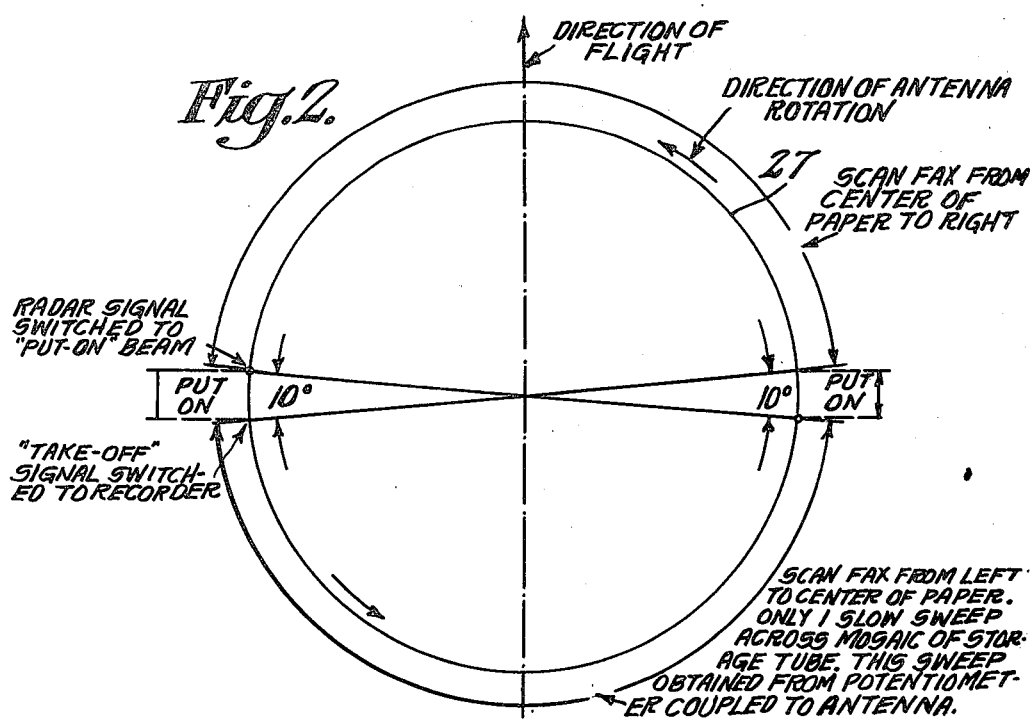
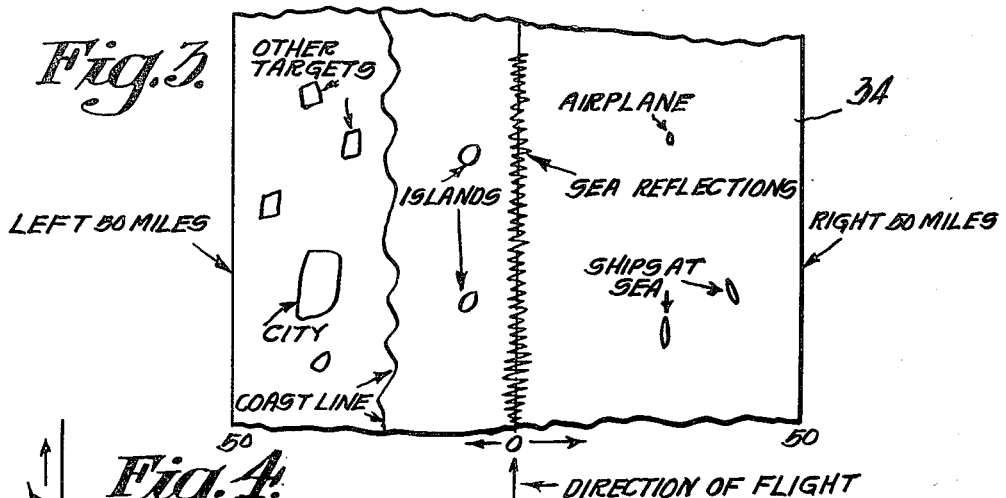
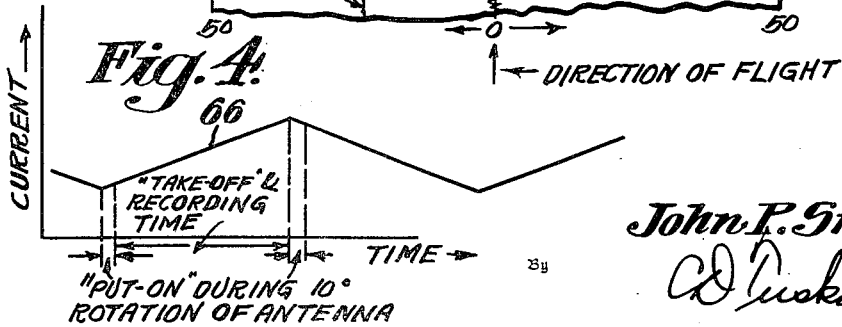
Inventor
John P. Smith
By
Attorney

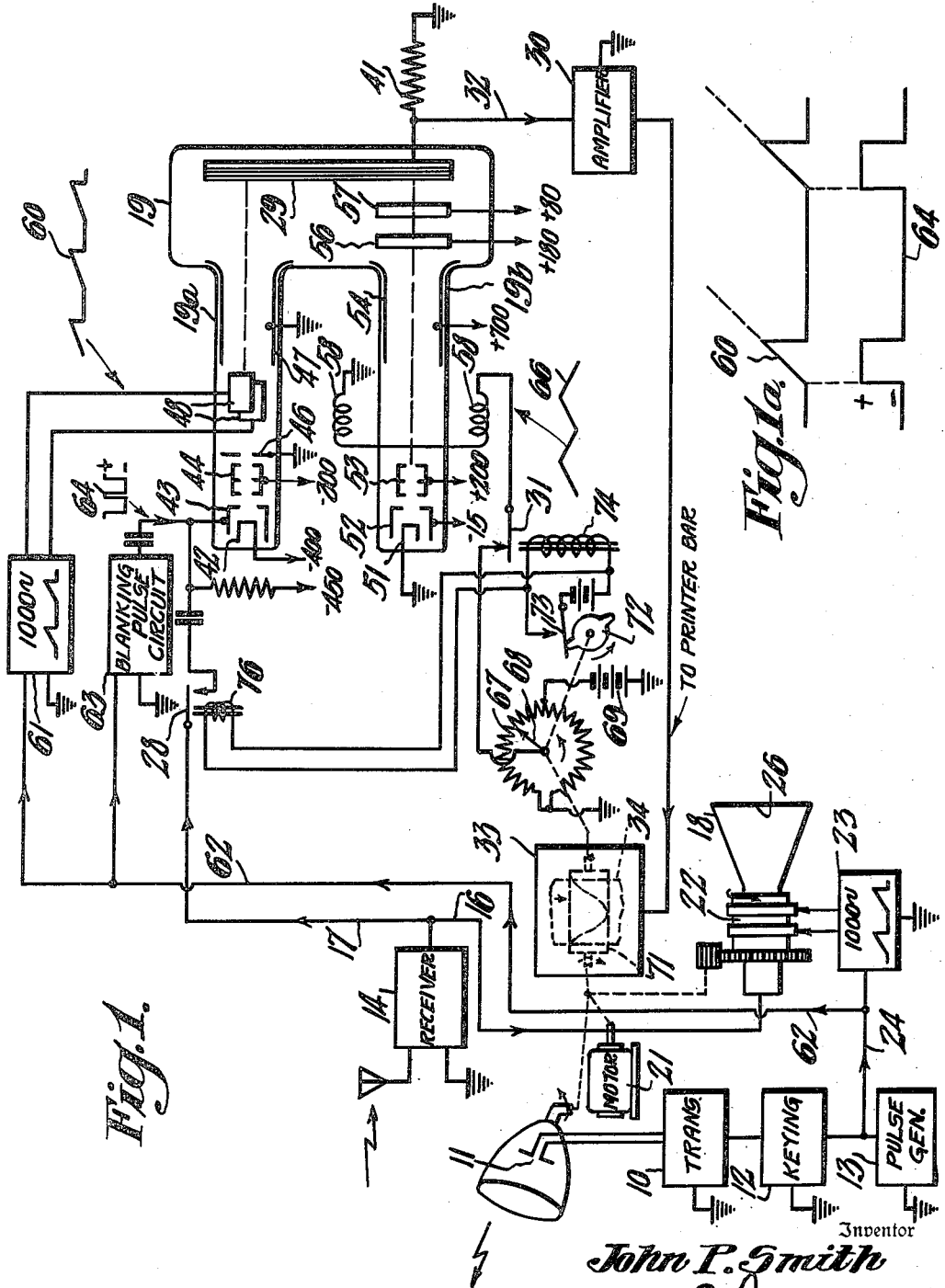

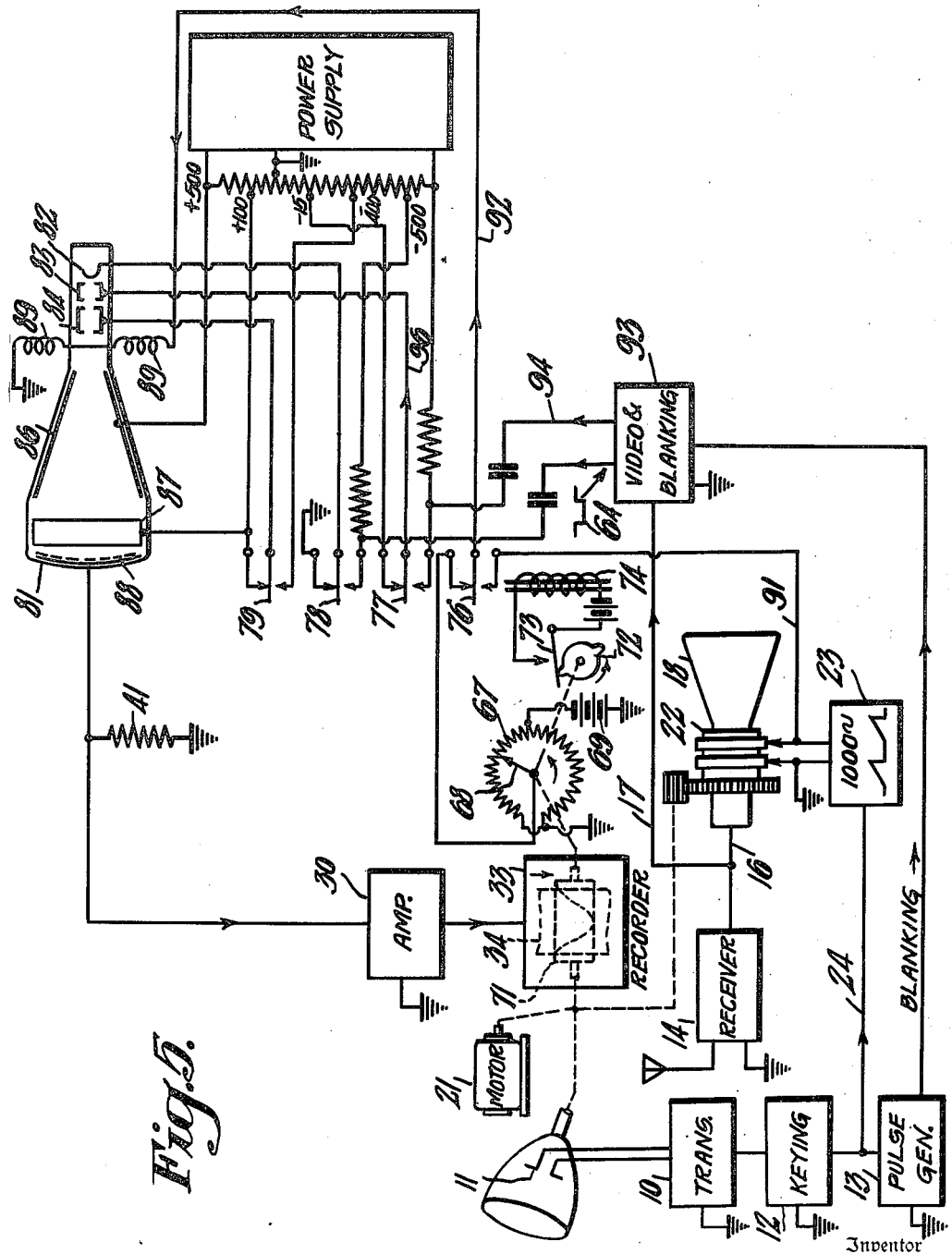

Patented July 9, 1946

2,403,562

UNITED STATES PATENT OFFICE 2,403,562

RECORDER FOR RADAR SYSTEMS

John P. Smith, Cranbury, N. J., assignor to Radio Corporation of America, a corporation of Delaware Application August 30, 1943, Serial No. 500,737

11 Claims. (Cl. 178—5)

My invention relates to radio locator systems wherein the received information is recorded. More particularly it relates to systems for recording the position of radio wave reflecting objects on a tape or strip of paper for obtaining a strip map.

An object of the invention is to provide an improved method of and means for locating and recording the position of wave reflecting objects.

Another object of the invention is to provide an improved method of and means for making a strip map of land or water and of objects such as buildings or ships thereon.

Still another object of the invention is to provided improved cathode ray storage tube apparatus and to provide an improved method of operating such apparatus.

Still another object of the invention is to provide an improved method of and means for utilizing a rotating directive antenna for recording the location of reflecting objects.

In the preferred embodiments of the invention the radio locator equipment is a pulse-echo system of the "PPI" type comprising a sharply directive antenna that is continuously rotated to search for or scan reflecting objects. In order to utilize the information thus obtained for obtaining a strip map of territory that is flown over by an airplane carrying the locator equipment, the signal picked up by the rotating antenna is applied to a storage device such as a cathode ray storage tube only during the short intervals that the antenna radiation pattern is directed to the right and to the left of the line of flight. For example, these intervals may be the periods during which the antenna is rotating through 10 degrees when pointing to the right and during which it is rotating through 10 degrees when pointing to the left.

The signals recorded during each short "signal put-on" interval are taken off the storage device during the longer antenna rotation period following the "put-on" interval. In this way the resolution of the system is made good enough to indicate the outline or character of the reflecting object and, at the same time, the signal may be taken off the storage device slowly enough for recording it on a slow-speed recorder such as a recorder of the type used in facsimile systems.

Also, in one preferred embodiment of the invention the storage device is a single gun cathode ray tube having an associated power supply and switching means for operating the tube alternately as a high velocity electron beam tube for signal "put-on" and as a low velocity electron beam tube for signal "take-off."

The invention will be better understood from the following description taken in connection with the accompanying drawings in which Figure 1 is a block and circuit diagram of a radio locator and strip mapping system embodying the invention, Figure 1a is a pair of graphs that are referred to in explaining the operation of the circuit shown in Fig. 1, Figure 2 is a diagram showing for the system of Fig. 1, the relation between the antenna rotation and the sequence of operation of the recording system, Figure 3 is a view of a piece of strip map of the character that may be obtained with the system of Fig. 1, Figure 4 is a graph that is referred to in explaining the invention, and Figure 5 is a block and circuit diagram of an embodiment of the invention in which a single-gun storage tube is employed.

In the several figures, similar parts are indicated by similar reference characters.

Fig. 1 shows the invention applied to a pulse-echo system comprising a radio transmitter 10, a rotatable directive antenna 11, and a pulse keyer 12 and a pulse generator 13 for pulse modulating the transmitter 10. The radio pulses after reflection from a target or other object are received and demodulated by a radio receiver 14 and supplied over conductors 16 and 17 to the grid of a cathode ray indicator tube 18 and to the "signal put-on" section of a cathode ray storage tube 19, respectively.

The antenna 11 is rotated at a uniform speed about a vertical axis by means of a motor 21. The motor 21 also rotates a deflecting yoke 22 on the indicator tube 18 at the same speed as and in synchronism with the antenna rotation. Radial deflection of the electron beam of the tube 18 is produced by means of recurring sawtooth pulses of current supplied to the yoke 22 from a deflecting wave generator 23. The generator 23 is synchronized with the radio pulse transmission by pulses supplied over a conductor 24 from the pulse generator 13. As well understood in the art, echo pulses supplied over conductor 16 to the tube 18 will produce a bright spot on a fluorescent screen 26 at a point corresponding to the location of the reflecting object.

Referring now to the portion of the system for recording or mapping in accordance with the present invention, the storage tube 19 comprises a high velocity beam "signal put-on" section 19a and a low velocity beam "signal take-off" section 19b. Before describing the storage tube construction, reference is made to Fig. 2 showing the sequence of operation. It is assumed that the system of Fig. 1 is on an airplane flying in the direction indicated in Fig. 2. The antenna 11 rotates continuously through 360 degrees as indicated by the circle 27. During its rotation through about 10 degrees when pointing to the left, the switch 28 (Fig. 1) is closed whereby signal from the receiver is stored on the storage screen 29 of the storage tube 19. At the end of the 10 degree rotation, the switch 28 is opened and a switch 31 (Fig. 1) is closed to deflect the low velocity beam in the tube section 19b across the storage screen 29 at a slow rate to take off the stored signal. The signal thus taken off is supplied over a conductor 32 and through an amplifier 30 to the printer bar (not shown) of a facsimile recorder 33. By the time the "take-off" sweep is completed the antenna 11 is pointing to the right and the switch 28 again closes to put on signal during the next 10 degrees of antenna rotation and the above-described action is repeated. The record thus obtained is a strip map as illustrated in Fig. 3 where a short piece of strip record 34 is shown. It will be noted that the distances to objects at the left and at the right of the airplane are measured from the center line of the strip map.

Referring more particularly to the system as shown in Fig. 1, the storage tube 19 may be constructed as described in copending application Serial No. 492,658, filed June 26, 1943 by Iams, Rose and Krieger and entitled Cathode ray storage tube.

The storage screen 29 comprises a sheet of insulating material such as mica which has a multiplicity of parallel strips of conducting material that are insulated from each other. These strips may be formed by evaporating a metal upon the mica sheet and then scratching through the metal coating with a ruling machine. A metal coating on the back side of the mica sheet functions as the back plate to which the output resistor 41 is connected.

The signal put-on section 19a contains a cathode 42, a control electrode 43, a first anode 44, a screen grid 46, a second anode 47, and a pair of vertical deflecting plates 48 for deflecting the high speed beam transversely across the conducting strips on the storage screen 29.

The signal take-off section 19b contains a cathode 51, a control electrode 52, a first anode 53, a second anode 54, and a pair of ring electrodes 56 and 57 which slow down the electron beam as it approaches the storage screen 29. A pair of vertical deflecting coils 58 are provided to deflect the beam transversely across the conducting strips of the screen 29.

The deflecting voltage, indicated at 60, for the deflecting plates 48 is obtained from a deflecting wave generator 61 which is synchronized by pulses from the pulse generator 13 that are supplied over a conductor 62. The synchronizing pulses are also supplied from conductor 62 to a blanking pulse circuit 63 which applies negative pulses 64 to the control grid 43 whereby the electron beam is blocked as soon as it is swept across the screen 29 by a sawtooth portion of the wave 60. Fig. 1a shows the time relation between the deflecting wave 60 and the blanking pulse 64. It will be understood that the electron beam in tube section 19a will be deflected across the screen 29 several times during the interval that the switch 28 is closed.

The triangular deflecting current, indicated at 66, for the deflecting coils 58 is obtained from a potentiometer resistor 67 and its rotating arm 68. A battery 69 maintains a current flow through the upper and lower halves of the resistor 67 to ground whereby the current through the coils 58 increases and decreases linearly as the arm 68 is rotated, assuming the switch 31 is closed.

The antenna 11, the scanning drum 71 of the recorder 33, the potentiometer arm 68, and a switch cam 72 are all rotated at the same speed and in synchronism by the motor 21 as indicated by the broken lines. The cam 72 closes a switch 73 for a short interval twice per rotation to energize a relay coil 74 and open the switch 31 during said short intervals. During these same intervals, a relay coil 76 is also energized to close the switch 28 during said intervals.

The sequence of operation of the system with respect to the triangular wave scanning and the recording is illustrated in Fig. 4.

Fig. 5 shows an embodiment of the invention utilizing a single-gun storage tube 81. The tube 81 may be constructed substantially the same as the low velocity beam section 19b of the tube 19 shown in Fig. 1. It includes a cathode 82, a control electrode 83, a first anode 84, a second anode 86, a ring electrode 87, and a storage screen 88. A second ring electrode may be included in the tube structure as shown for the tube 19, if desired. The storage screen 88 is similar to the screen 29 (Fig. 1) comprising parallel storage strips. The electron beam of the tube 81 is deflected transversely across the storage strips of the screen 88 by means of deflecting coils 89.

By operating the tube 81 first as a high velocity beam tube for storing the received signal and then as a low velocity beam tube for taking off the stored signal and supplying it to the recorder 33, the system functions substantially the same as the system of Fig. 1 and it produces the same kind of strip map as shown in Fig. 3. The desired alternate tube operation is obtained by means of the cam operated switch 73 and relay coil 74 which pulls switch arms 76, 77, 78 and 79 to the down or "signal put-on" position when the switch 73 is closed, and which releases them to the up or "signal take-off" position when the switch 73 is open.

During the greater part of the cycle of operation, the switch arms 76, 77, 78 and 79 are in the "up" position. During this period, the switch arm 76 is in position to supply triangular deflecting current from the potentiometer 67 to the deflecting coils 89, the switch arm 77 is in position to apply a suitable bias to the control electrode 83, and the switch arms 78 and 79 are in position to apply proper voltages to the cathode 82 and the first anode 84, respectively, for operating the tube with a low velocity beam suitable for signal take-off. During this period the stored signal is supplied through the amplifier 30 to the recorder 33 as described in connection with Fig. 1.

During a small part of the cycle of operation (during 10 degrees of antenna rotation, for example), the switch arms 76, 77, 78 and 79 are in the "down" position. During this period the high frequency sawtooth deflecting current from the sawtooth circuit 23 is supplied over conductors 91 and 92 to the deflecting coils 89. The received signal is supplied over conductor 17, through a video amplifier and blanking circuit 93, and through a conductor 94, the switch arm 77 and a conductor 96 to the control electrode 83 whereby the electron beam is modulated by the incoming signal. The switches 78 and 79 apply suitable voltages to the cathode 82 and anode 84, respectively, for high velocity beam operation. The switch 78 also applies a blanking voltage 64 to the cathode 82 for the purpose previously described.

When the above-described strip-mapping apparatus is mounted on an aircraft it may be advisable to control the orientation of the rotating antenna 11 by suitable means such as a gyro compass. For example, the antenna may be connected with the gyroscopic control equipment commonly employed on an airplane and so controlled that, regardless of the direction in which the airplane is headed at a particular time, the first and second "put-on" periods occur when the antenna is pointing west and east, respectively. In this example, it is assumed that the airplane is traveling in the general direction of north and south.

It may be noted that the narrower the radiation pattern of the antenna, the better will be the resolution of the system in a direction parallel to the direction of flight of the airplane carrying the mapping equipment.

I claim as my invention:

1. A radio locator system comprising a rotatable directive antenna, means including said antenna for transmitting a periodically modulated radio wave toward a reflecting object, a radio receiver for receiving the wave reflected from said object, a cathode ray tube having a screen upon which a signal may be stored, means including said cathode ray tube for storing said received wave on said screen during a small angular rotation only of said antenna whereby the stored signals are representative of the distance to a reflecting object in the path of the transmitted wave, said storing means also including means for deflecting said cathode ray at a comparatively high repetition rate, cathode ray tube means for scanning said screen at a comparatively slow rate at the end of said small angular rotation to produce a distance representative signal that may be recorded, a recorder which includes scanning means, and means for synchronizing said slow scanning of said screen with the scanning of said recorder.

2. A radio locator system comprising a rotatable directive antenna, means including said antenna for transmitting periodically recurring pulses of radio energy toward reflecting objects, a radio receiver for receiving the pulses reflected from said objects, a cathode ray tube having a screen upon which a signal may be stored, means including said cathode ray tube for storing said received pulses on said screen during a small angular rotation only of said antenna to obtain stored signals representative of the distance to said reflecting objects, said storing means also including means for deflecting said cathode ray at a comparatively high repetition rate and in synchronism with said pulse transmission, a cathode ray tube means for scanning said screen at a comparatively slow rate at the end of said small angular rotation to produce a distance representative signal that may be recorded, a recorder which includes scanning means, and means for synchronizing said slow scanning of said screen with the scanning of said recorder.

3. A strip-mapping system comprising an antenna system for radiating to the left and to the right, means including said antenna system for transmitting a periodically modulated radio wave alternately to the left and to the right toward reflecting objects, a radio receiver for receiving the wave reflected from said objects, a cathode ray tube having an electrostatic storage screen upon which a signal may be stored, means including said cathode ray tube for storing said received wave on said screen during each period of radiation from said antenna system whereby the stored signals are representative of the distance to said reflecting objects, said storing means also including means for deflecting said cathode ray at a comparatively high repetition rate, cathode ray tube means for scanning said screen at a comparatively slow rate at the end of each period of radiation to produce a distance representative signal that may be recorded, a recorder which includes scanning means, and means for synchronizing said slow scanning of said screen with the scanning of said recorder.

4. A strip-mapping system comprising an antenna system for radiating radio waves in sharply directive radiation patterns to the left and to the right, means including said antenna system for transmitting a periodically modulated radio wave alternately to the left and to the right toward reflecting objects during short radiation periods, respectively, a radio receiver for receiving the wave reflected from said objects, a cathode ray tube having a screen upon which a signal may be stored, means including said cathode ray tube for storing said received wave on said screen during each period of radiation from said antenna system whereby the stored signals are representative of the distance to said reflecting objects, said storing means also including means for deflecting said cathode ray at a comparatively high repetition rate, cathode ray tube means for scanning said screen at a comparatively slow rate at the end of each short period of radiation and during a comparatively long recording period to produce a distance representative signal that may be recorded, a recorder which includes scanning means, and means for synchronizing said slow scanning of said screen with the scanning of said recorder.

5. A strip-mapping system comprising an antenna system for radiating to the left and to the right, means including said antenna system for transmitting a periodically modulated radio wave alternately to the left and to the right toward reflecting objects during short radiation periods, respectively, a radio receiver for receiving the wave reflected from said objects, a cathode ray tube having a storage screen comprising parallel storage strips upon which a signal may be stored in the form of electric charges, means including said cathode ray tube for storing said received wave on said screen during each period of radiation from said antenna system whereby the stored signals are representative of the distance to said reflecting objects, said storing means also including means for deflecting said cathode ray transversely across said strip at a comparatively high repetition rate, cathode ray tube means for scanning said strips transversely at a comparatively slow rate at the end of each short period of radiation and during a comparatively long recording period to produce a distance representative signal that may be recorded, a recorder which includes scanning means, and means for synchronizing said slow scanning of said screen with the scanning of said recorder.

6. A radio locator system comprising a rotatable directive antenna, means for transmitting a periodically modulated radio wave alternately to the left and to the right toward reflecting objects during small angular rotations only of said antenna, a radio receiver for receiving the waves reflected from said objects, a cathode ray tube having a screen upon which signals may be stored, means for storing said reflected waves on said screen during said small angular rotations to produce stored signals representative of reflecting objects to the left and to the right which indicate the distance to the reflecting objects, said last means also including means for deflecting said cathode ray at a comparatively high repetition rate, cathode ray tube means for scanning said left and right stored signals at a comparatively slow rate at the end of each small angular rotation and in opposite directions to produce low frequency signals that may be recorded, a recorder which includes means for scanning in only one direction during said slow scanning of the left and right stored signals, means for applying said low frequency signals to said recorder, and means for synchronizing said slow scanning of said stored signals with the scanning of said recorder.

7. A strip-mapping system comprising a rotatable directive antenna, means for transmitting pulses of radio energy alternately to the left and to the right toward reflecting objects during small angular rotations only of said antenna, a radio receiver for receiving the pulses reflected from said objects, a cathode ray tube having a screen upon which signals may be stored, means for storing said reflected pulses on said screen during said small angular rotations to produce stored signals which are representative of reflecting objects to the left and to the right and which indicate the distances to the reflecting objects, said last means also including means for deflecting said cathode ray at a comparatively high repetition rate, cathode ray tube means for scanning said left and right stored signals at a comparatively slow rate at the end of each small angular rotation and in opposite directions to produce low frequency signals that may be recorded, a recorder which includes means for scanning in only one direction during said slow scanning of the left and right stored signals, means for applying said low frequency signals to said recorder, and means for synchronizing said slow scanning of said stored signals with the scanning of said recorder.

8. In combination, a cathode ray tube comprising a storage screen for storing electric charges, a plurality of electrodes for producing an electron beam and directing it against said screen, means for deflecting said beam across said screen, means for modulating said beam by a signal during said deflection whereby said signal is stored on said screen, means for applying comparatively large voltage differences to said electrodes during said deflection, means for deflecting said beam across said screen after said signal has been stored thereon, means for taking said stored signal off said screen during said last-mentioned deflection, and means for applying comparatively small voltage differences to said electrodes during said last-mentioned deflection.

9. The invention according to claim 8 wherein said small voltage differences are such as to make said tube function as a low velocity beam tube.

10. In combination, a cathode ray tube comprising a storage screen for storing electric charges, a plurality of electrodes for producing an electron beam and directing it against said screen, means for deflecting said beam across said screen at a certain rate, means for modulating said beam by a signal during said deflection whereby said signal is stored on said screen, means for applying comparatively large voltage differences to said electrodes during said deflection, means for deflecting said beam across said screen at a different rate, means for taking said stored signal off said screen during said deflection at said different rate, means for applying comparatively small voltage differences to said electrodes during said deflection at said different rate, and means for switching said two voltage applying means for applying said large voltage differences and said small voltage differences alternately to said electrodes.

11. A strip-mapping system comprising an antenna system for radiating to the left and to the right, means including said antenna system for transmitting a periodically modulated radio wave alternately to the left and to the right toward reflecting objects, a radio receiver for receiving the wave reflected from said objects, a cathode ray tube comprising a storage screen for storing electric charges, a plurality of electrodes for producing an electron beam and directing it against said screen, means for deflecting said beam across said screen at a rapid rate, means for modulating said beam by said received wave during said deflection and during each period of radiation from the antenna system whereby the received signal is stored on said screen, means for applying comparatively large voltage differences to said electrodes during said deflection, means for deflecting said beam across said screen at a comparatively slow rate, means for taking said stored signal off said screen during said last-mentioned deflection, means for applying comparatively small voltage differences to said electrodes during said last-mentioned deflection, a recorder which includes scanning means, means for applying said stored signal to said recorder, and means for synchronizing said slow scanning of said screen with the scanning of said recorder.

JOHN P. SMITH.